United States Patent [19]
Ando

[11] Patent Number: 5,124,963
[45] Date of Patent: Jun. 23, 1992

[54] METHOD AND APPARATUS FOR SELECTIVELY CHANGING ARCHIVAL INFORMATION ON AN OPTICAL DISK

[75] Inventor: Ryo Ando, Tokyo, Japan

[73] Assignee: Sony Corporation, Tokyo, Japan

[21] Appl. No.: 636,557

[22] Filed: Jan. 7, 1991

Related U.S. Application Data

[63] Continuation of Ser. No. 165,841, Mar. 9, 1988, abandoned.

[30] Foreign Application Priority Data

Mar. 11, 1987 [JP] Japan .................... 62-55537

[51] Int. Cl.⁵ .............................................. G11B 7/085
[52] U.S. Cl. .................................... 369/32; 369/50; 369/54; 369/58
[58] Field of Search ................................ 369/32-33, 369/47, 48, 50, 54, 58, 124; 360/72.2, 78.04; 358/342; 365/215, 234

[56] References Cited

U.S. PATENT DOCUMENTS

| | | | |
|---|---|---|---|
| 4,210,785 | 7/1980 | Huber et al. | |
| 4,229,808 | 10/1980 | Hui | 369/48 |
| 4,428,074 | 1/1984 | Abe et al. | 369/32 |
| 4,545,044 | 10/1985 | Satoh et al. | 369/58 X |
| 4,573,084 | 2/1986 | Iida | 369/32 X |
| 4,788,672 | 11/1988 | Toyooka et al. | 369/32 |
| 4,789,979 | 12/1988 | Hiraoko et al. | 369/32 X |
| 4,811,315 | 1/1989 | Inazawa | 369/32 |
| 4,827,462 | 5/1989 | Flannagan et al. | 369/32 |
| 4,835,757 | 5/1989 | Abiko | 369/32 X |

FOREIGN PATENT DOCUMENTS

| | | |
|---|---|---|
| 0029946 | 11/1980 | European Pat. Off. |
| 0024858 | 3/1981 | European Pat. Off. |
| 0074841 | 3/1983 | European Pat. Off. |
| 0164131 | 12/1985 | European Pat. Off. |
| 0169597 | 1/1986 | European Pat. Off. |
| 0215133 | 3/1987 | European Pat. Off. |
| 0275972 | 7/1988 | European Pat. Off. |
| 0288571 | 11/1988 | European Pat. Off. |

Primary Examiner—Roy N. Envall, Jr.
Assistant Examiner—W. R. Young
Attorney, Agent, or Firm—Lewis H. Eslinger; Jay H. Maioli

[57] ABSTRACT

A disk recording and/or reproducing apparatus for a recordable disk of the kind provided with absolute addresses, such as a recordable and reproducible compact disk, wherein a program area and a lead-in area are provided on the disk, data such as the performance information is recorded in the program area, archival information showing the record contents of the program area is recorded in the lead-in area, and the program area is reproduced on the basis of the archival information in the program area. According to the present invention, the archival information is reproduced from the lead-in area, the sequence contained in the information is changed, and the information which has been changed in its sequence is re-recorded in the lead-in area.

4 Claims, 8 Drawing Sheets

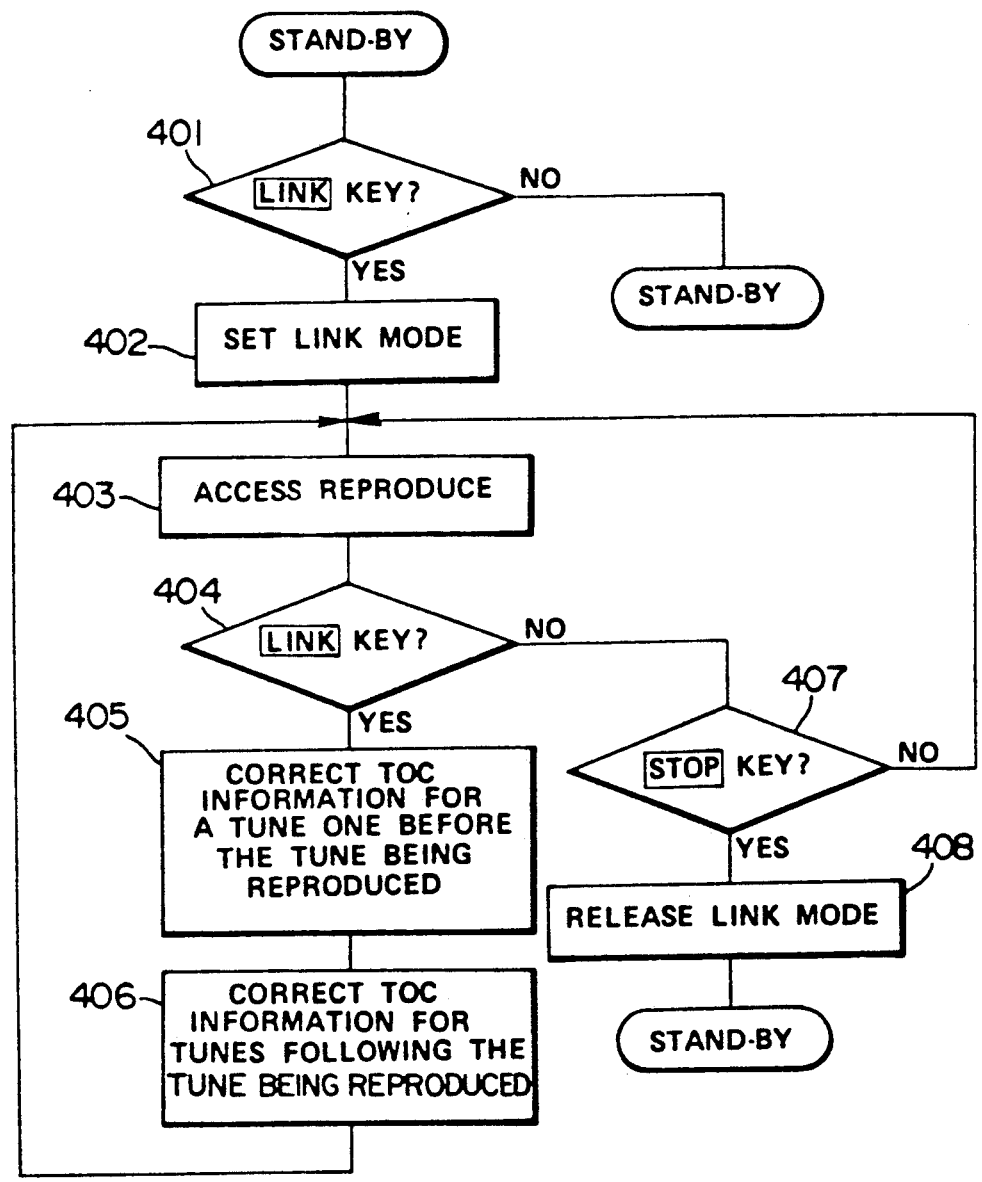

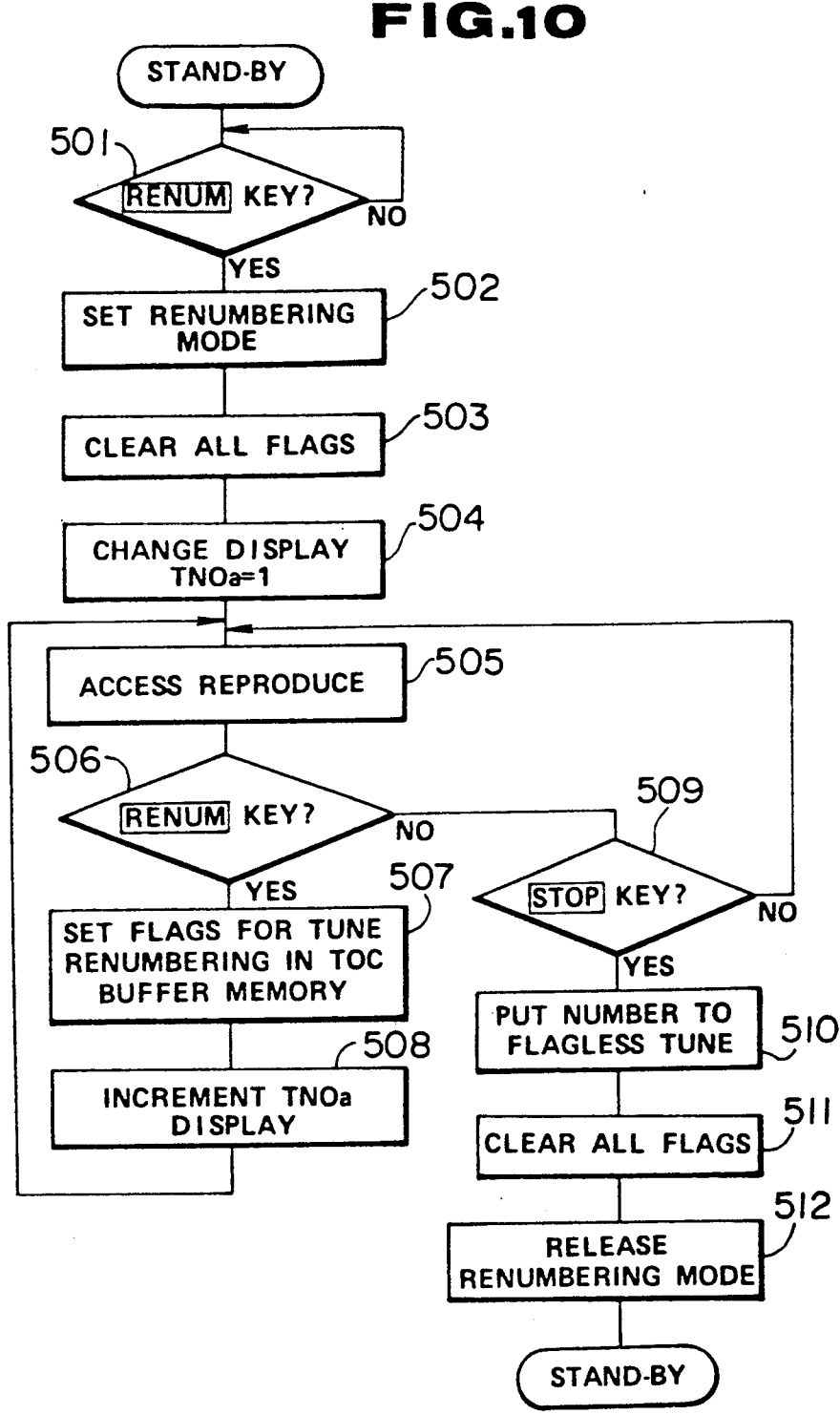

5,124,963

METHOD AND APPARATUS FOR SELECTIVELY CHANGING ARCHIVAL INFORMATION ON AN OPTICAL DISK

This is a continuation of application Ser. No. 07/165,841, filed Mar. 9, 1988, now abandoned.

BACKGROUND OF THE INVENTION

1. Field of the Invention

This invention relates to a method and an apparatus for recording and/or reproducing to and from a recordable disk previously provided with absolute addresses, wherein a program area and a lead-in area are provided on the disk, the data such as the performance information is recorded in the program area, an archival information, that is, the table of contents or TOC information. showing the record contents in the program area, the recorded in the lead-in area, and wherein the program area is reproduced on the basis of the TOC information recorded in the lead-in area. The present invention may be applied for example to apparatus for a recordable and reproducing compact disk.

2. Description of the Prior Art

The disk player dedicated to reproduction, such as the CD player, adapted to reproduce a so-called compact disk (CD) in which audio signals such as speech or musical sounds are digitized and recorded on an optical disk. has been presented and made available to the market. In the compact disk, the TOC information showing the record contents of the disk, such as the time code sequentially indicating the start time points of the tunes recorded in the program area, the tune numbers of the first and last tunes, the time points at which the performance of the last tune is terminated, etc. is recorded in the lead-in area provided inside the program area. The CD player is so designed as to reproduce the TOC information recorded in the lead-in area of the disk first of all and to reproduce the performance information of the tunes from the program area on the basis of the TOC information or to perform the programmed reproduction.

In consideration of the fact that the conventional CD player is dedicated to reproduction, attempts have been made to develop a disk system which, through the use of an opto-magnetic disk formed of a post-writable opto-magnetic recording medium, may be adapted for recording and reproduction to maintain upper compatibility with respect to the compact disk.

The recordable disk 1 employed in the disk system is formed with a number of spirally extending pre-grooves 2 each having a depth of λ/8, λ being the wavelength of the laser light used for recording the information, as shown in the diagrammatic view of FIG. 1. On each land 3 between the adjacent pre-grooves 2, pre-recorded areas 4 where a series of patterns of projections and recesses formed by pits λ/4 deep are previously recorded in the circumferential direction are formed alternately with data record areas 5 where opto-magnetic recording is performed. On the inner side of the program area 6 of the recordable disk 1 where the performance information is recorded, there is formed a lead-in area 7 where the TOC information showing the record contents of the program area 6 is recorded. In the pre-recorded area 4 of the recordable disk 1, there are recorded 24-bit synch signals and 14-bit or 1-symbol sub-code signals as patterns of projections and recesses obtained by molding, these sub-code signals being absolute time information or absolute addresses commencing from the start position of the program area 6. These sync and sub-code signals are among 588 channel-bit eight to fourteen modulation or EFM data including in addition to the aforementioned sync and sub-code signals, 14×32 bit or 32-symbol data such as the performance information, parity data and 3 margin bits between the adjacent symbols, these constituting each form of the data format standardized in the compact disk, as shown in FIG. 2.

In the disk system employing the recordable disk 1, the rotational velocity of the disk is controlled to a constant linear velocity (CLV) by taking advantage of the absolute address reproduced from the pre-recorded area 4 of the recordable disk 1, so that the performance information, for example, is recorded in accordance with the data format standardized in the compact disk (CD), while the TOC information indicating the sequence of the recorded information units, for example, is recorded in the lead-in area 7. The information units in the program area 6 are sequentially reproduced in accordance with the TOC information contained in the lead-in area 7.

It will be noted that, in a disk system providing for both recording and reproduction and designed to be in the relation of upper compatibility with respect to the compact disk, it may occur that the tunes recorded in the program area of the recordable disk are not in the correct sequence. For example, when a new tune is recorded in a non-recorded area between two adjacent tunes, or when a new tune is re-recorded in the previously recorded area, the sequence of the previously recorded tunes necessarily becomes indefinite.

On the other hand, certain disk recording and/or reproducing apparatuses are so designed that the TOC information indicating for example the sequences of the tunes or record information units is automatically formed and recorded in the lead-in area of the recordable disk, on the assumption that a silent period continuing for longer than a predetermined time represents the period between the adjacent tunes, the information units in the program area being sequentially reproduced on the basis of the so-formed TOC information. In classical music where continuing silent periods are frequently encountered, although these periods do not represent the periods between the tunes, the TOC information is recorded in the lead-in area as if plural tunes were recorded in the program area when only one tune is actually recorded therein, so that a complicated operation becomes necessary to perform management of the respective information units recorded in the program area.

OBJECT AND SUMMARY OF THE INVENTION

It is an object of the present invention to provide a disk recording and/or reproducing apparatus in which a program area and a lead-in area are provided on a recordable disk previously provided with absolute addresses, data such as the performance information is recorded in said program area, an archival information or the TOC information is recorded in said lead-in area and in which said program area is reproduced on the basis of said archival information in said lead-in area, wherein the sequence in which the information recorded in the program area is reproduced may be optically commanded by the TOC information in said lead-in area.

It is another object of the present invention to provide a disk recording and/or reproducing apparatus in which a program area and a lead-in area are provided to a recordable disk previously provided with absolute addresses, data such as the performance information is recorded in said program area, an archival or TOC information showing the record contents in said program area is recorded in said lead-in area and in which said program area is reproduced on the basis of said TOC information in said lead-in area, wherein the absence of data to be recorded in said program area is detected and the TOC information sequentially indicating the respective information units recorded in said program area is automatically recorded in said lead-in area to provide for facilitated management of a series of information data recorded in said program area.

It is a further object of the present invention to provide a novel disk recording and/or reproducing apparatus capable of changing or modifying the TOC information reproduced from the lead-in area of the recordable disk and re-recording the thus changed TOC information.

It is a further object of the present invention to provide a method for recording and/or reproducing the information to and from a recordable disk, using a disk recording and/or reproducing apparatus in which a program area and a lead-in area are provided on a recordable disk previously provided with absolute addresses, data such as the performance information is recorded in said program area, an archival or TOC information showing the record contents in said program area is recorded in said lead-in area and in which said program area is reproduced on the basis of said TOC information in said lead-in area, wherein the sequence in which the information recorded in said program area may be optionally commanded by the TOC information in said lead-in area.

It is still another object of the present invention to provide a method for recording and/or reproducing the information to and from a disk, using a disk recording and/or reproducing apparatus in which a program area and a lead-in area are provided on a recordable disk previously provided with absolute addresses, data such as the performance information is recorded in the lead-in area and in which said program area is reproduced on the basis of said TOC information in the lead-in area, wherein the absence of data to be recorded in said program area is detected, the TOC information sequentially indicating the information units recorded in the program area is automatically recorded in the lead-in area so as to provide for more facilitated management of the data or information recorded in said program area, the TOC information sequentially indicating the information units in the program area of the recordable disk is reproduced from said lead-in area so as to be stored in TOC information storage means, and the information units in said program area are reproduced on the basis of said TOC information; and wherein, on reception of an operating input commanding the TOC information to be corrected during reproduction, it is determined that the information unit being reproduced constitutes an information unit along with be preceding information unit and the TOC information stored in said TOC information storage means is accordingly corrected, with the so-corrected TOC information being read out from said TOC information storage means so as to be re-recorded in the lead-in area of the recordable disk.

These objects of the present invention may be accomplished by the apparatus and the method according to the appended claims.

BRIEF DESCRIPTION OF THE DRAWINGS

FIG. 9 is a flow chart showing the operation of the link mode of the disk recording and/or reproducing apparatus.

FIG. 10 is a flow chart showing the operation of the renumbering mode of the disk recording and/or reproducing apparatus.

FIG. 11 is a diagrammatic view showing the display contents of the display unit during the renumbering mode.

DESCRIPTION OF THE PREFERRED EMBODIMENT

Figure 1:
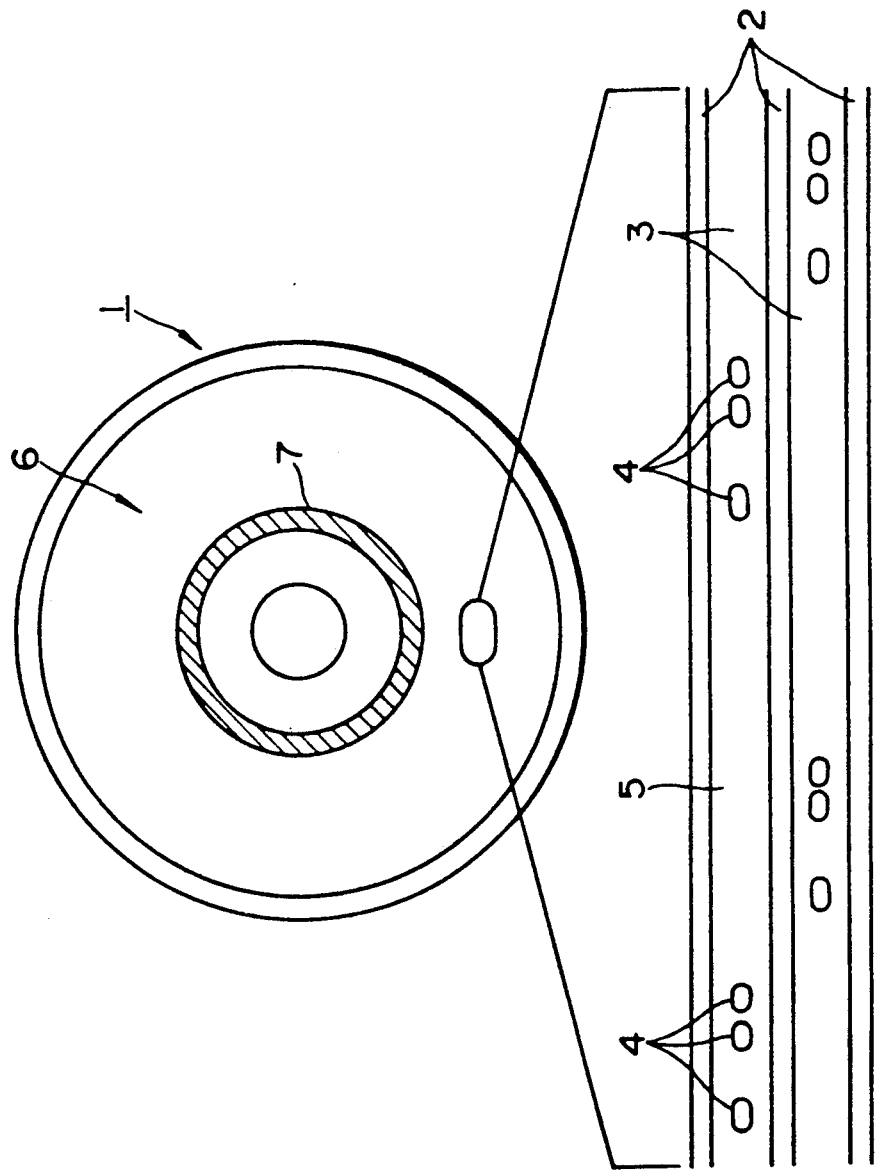
FIG. 1 is a diagrammatic view showing the recording format of the recordable disk employed in the recording and/or reproducing apparatus according to the present invention.
Figure 2:
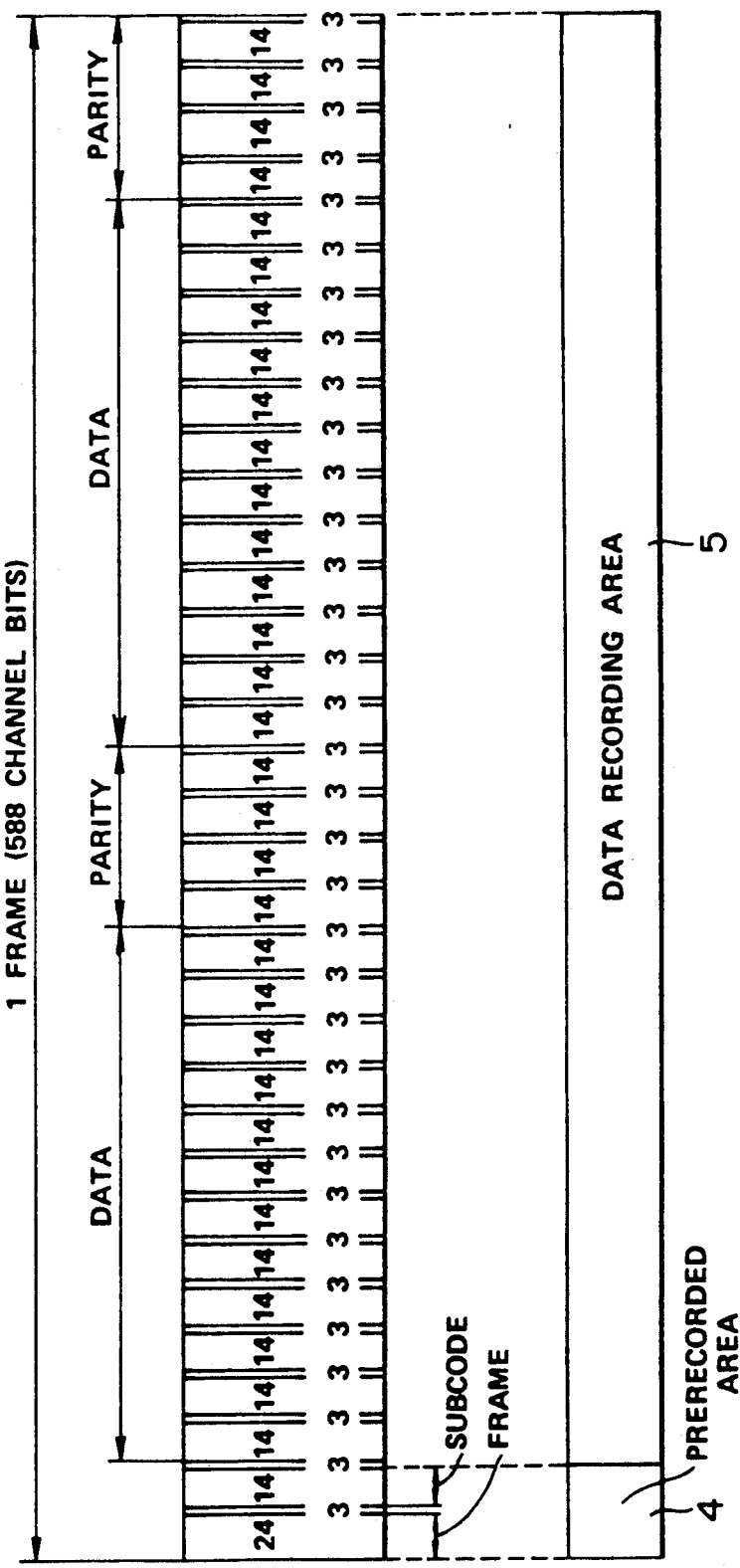
FIG. 2 is a diagrammatic view showing the data format of the information recorded in said recordable disk.

In the following embodiment, the present invention is applied to a disk recording and reproducing apparatus wherein an opto-magnetic disk having a perpendicular magnetized film having magneto-optical effects as the recording medium is used as the recordable disk 1 having the recording format as shown in FIG. 1, with the disk 1 being driven into rotation at a constant linear velocity (CLV) to record and/or reproduce the performance information of the data format of FIG. 2 which is standardized in the compact disk or CD.

Figure 3:
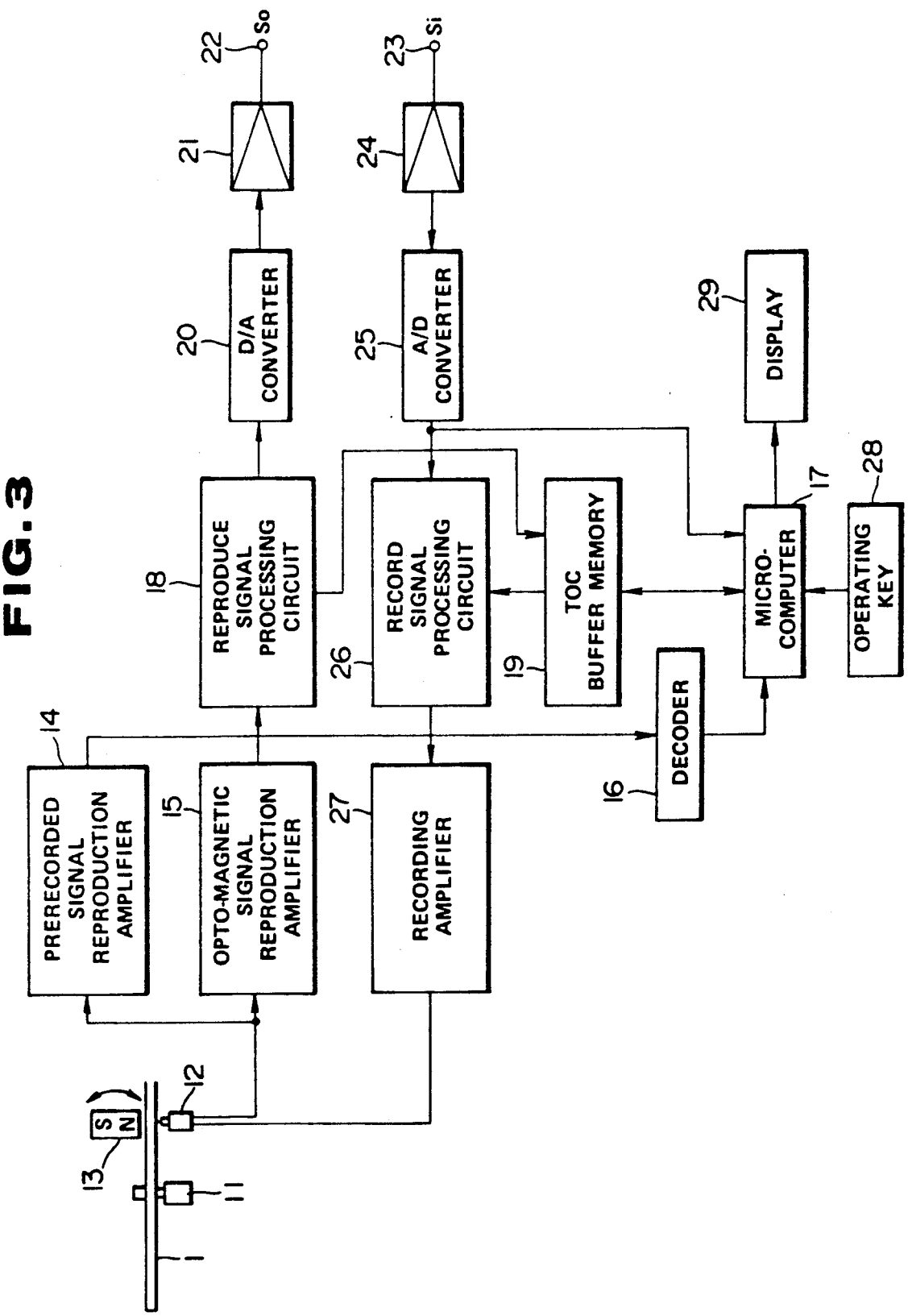
FIG. 3 is a block diagram showing the overall construction of the disk recording and/or reproducing apparatus to which the present invention is applied.

Referring now to the block diagram of FIG. 3, the disk recording and/or reproducing apparatus includes an optical head 12 and a magnet 13 arranged on both sides of the recordable disk 1 driven into rotation by a disk motor 11, with the optical head 12 being connected to a prerecorded signal reproducing amplifier 14 and to a opto-magnetic signal reproducing amplifier 15 as well as to a recording amplifier 27.

The optical head 12 is formed by optical components including a laser diode, a photo-detector, lenses and beam splitters and is adapted to record and/or reproduce information signals to and from the disk 1 by radiating the laser beam to the disk. The magnet 13 operates to produce a magnetic field for recording or erasing the information on or from the disk 1, with the sense of the magnetic poles thereof being reversed for the record and erase modes.

The reproduced RF signals read-out from the optical head 12 include those from the pre-recorded area 4, which are supplied through the prerecorded signal reproducing amplifier 14 to a decoder 16 where the absolute address data are decoded so as to be supplied to a micro-computer 17. The reproducing signals reproduced from the data record area 5 of the recordable disk 1 are supplied through the opto-magnetic signal reproducing amplifier 15 to a reproducing signal processing circuit 18 where the signals are processed in a predetermined manner. The performance information reproduced from the program area 6 of the recordable disk 1 is supplied from the reproducing signal processing circuit 18 to a digital to analog (D/A) converter 20 where it is converted into an analog form before being outputted as the reproduced audio signals So at a signal output terminal 22. The table of contents (TOC) information reproduced from the lead-in area 7 of the recordable disk 1 is supplied from the processing circuit 18 to a TOC buffer memory 19 where it is stored.

In the present disk recording and/or reproducing apparatus, the audio signals Si to be recorded in the program area 6 of the recordable disk 1 are supplied from the signal input terminal 23 through an analog to digital (A/D) converter 25 where they are converted into the corresponding digital signals. The performance information thus digitized in the A/D converter 25 is processed in a predetermined manner in a record signal processing circuit 26, after which it is supplied through the recording amplifier 27 to the optical head 12 so as to be recorded in the program area 6 of the recordable disk 1.

The output of the A/D converter 25 is also supplied as the silent part signal to the micro-computer 17, to which there are connected an operating key 28 adapted for inputting control data and a display unit 29 adapted for displaying various data.

Figure 4:
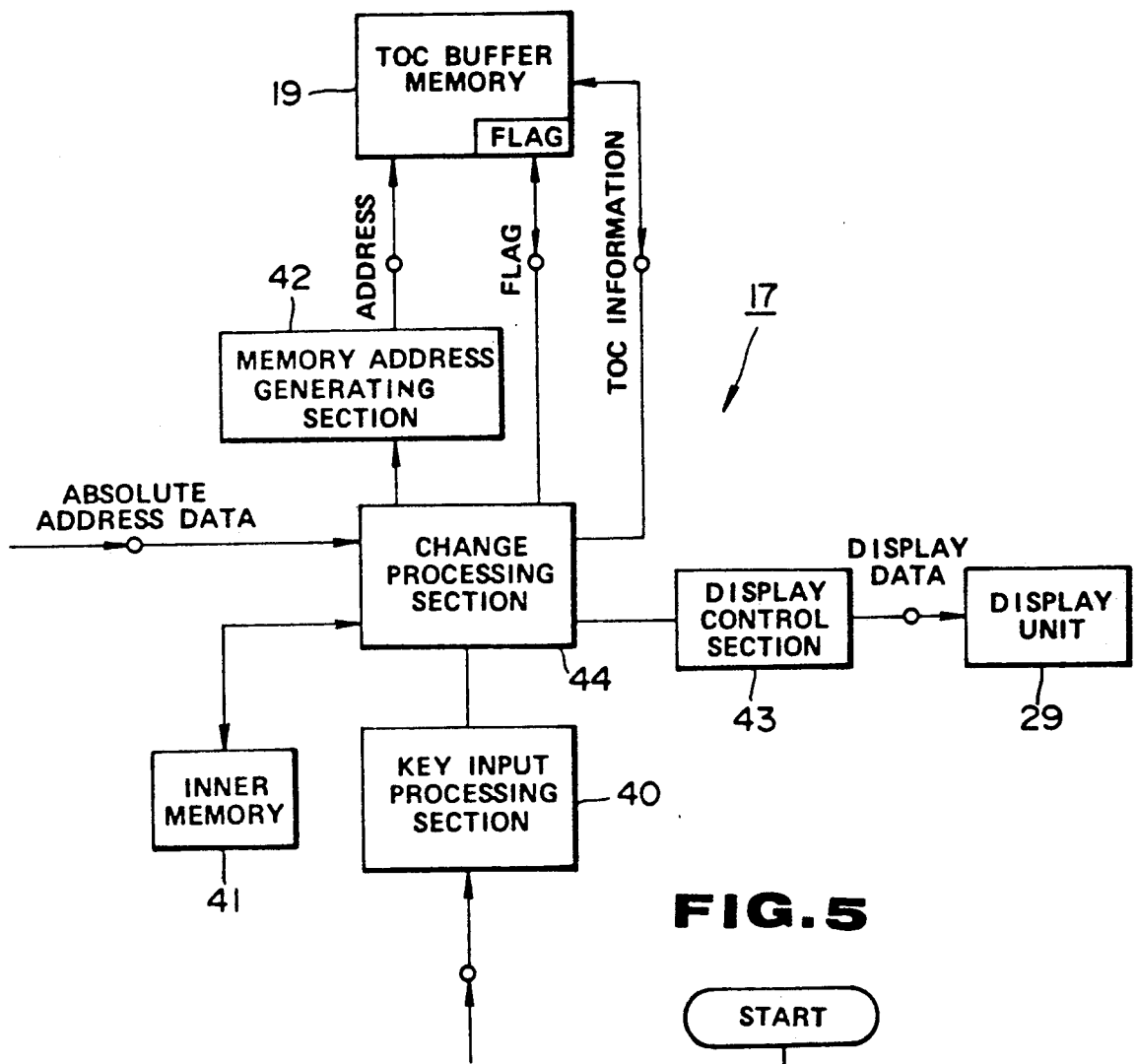
FIG. 4 is a block diagram showing the essential operation of a micro-computer provided to the disk recording and/or reproducing apparatus.

Referring now to the block diagram of FIG. 4 wherein the essential functions of the micro-computer 17 are illustrated, the micro-computer 17 is formed by a key input processing section 40 adapted for monitoring the operating state of the operating key 28 and receiving the inputting of the control data, an internal memory 41 for storage of various data such as the predetermined operating program, a memory address generating section 42 adapted for generating the data write/read address with respect to the TOC buffer memory 19, a display control section 43 adapted for controlling the operation of the display unit 29 and a change processing section 44 adapted for making a predetermined change in accordance with the operating program supplied from the internal memory.

Figure 5:
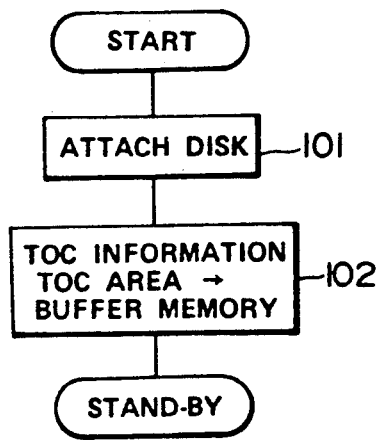
FIG. 5 is a flow chart showing the operation of the set-up mode for the disk recording and/or reproducing apparatus.

Referring now to the flow chart for the disk recording and/or reproducing apparatus shown in FIG. 5, when the recordable disk 1 is attached at step 101 at the start of the operation, the TOC information recorded in the lead-in area 7 of the recordable disk 1 is read out and reproduced by the optical head 12 so as to be stored in the TOC buffer memory 19 at step 102, the apparatus being then in the stand-by state.

Figure 6:
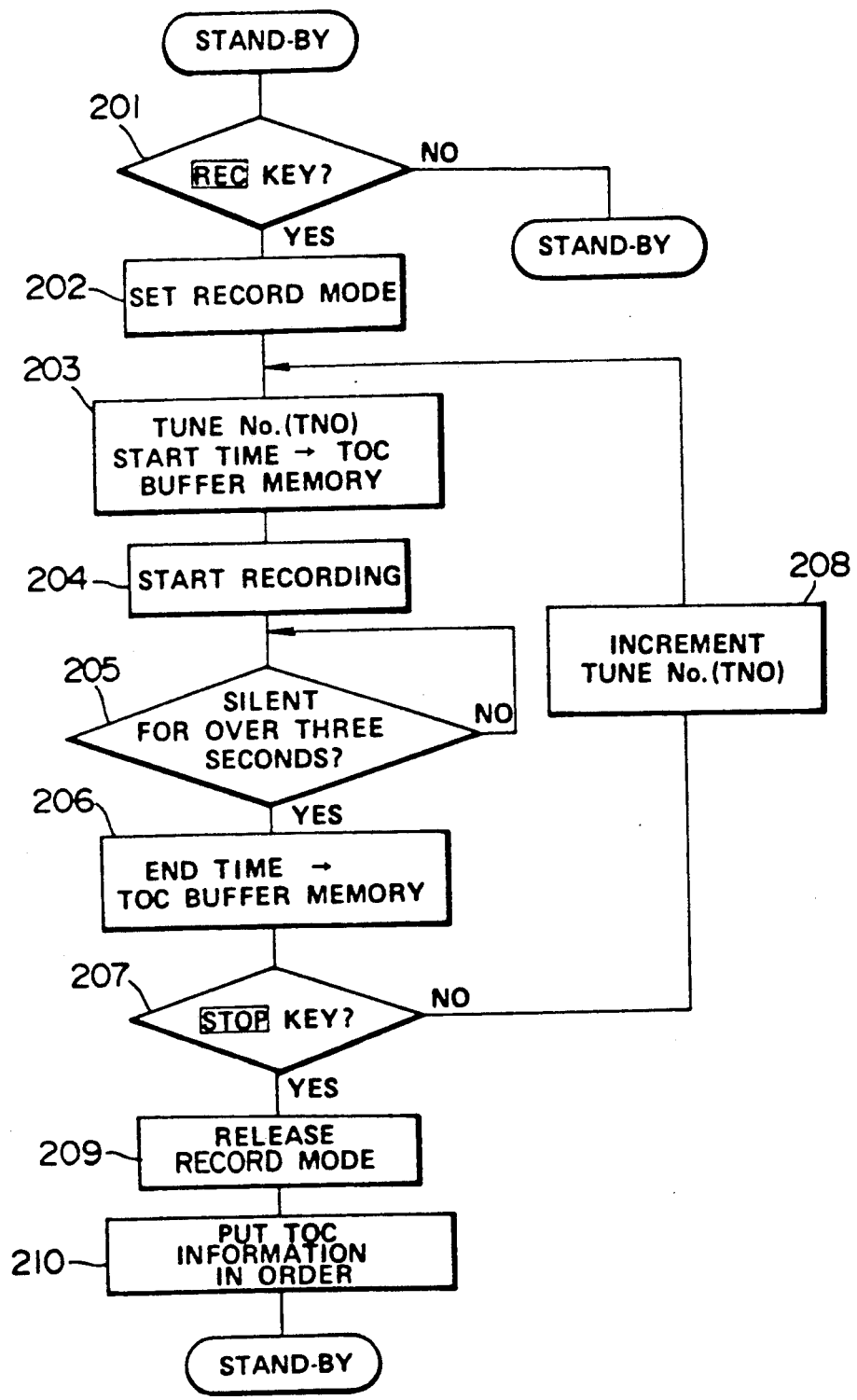
FIG. 6 is a flow chart showing the operation of the record mode.

In this stand-by state, the micro-computer 17 of the recording and/or reproducing apparatus monitors the operating state of the operating key 28 and is ready to receive the inputting of the control data thereto. When the micro-computer 17 receives at step 201 the operation of a REC key as shown in the flow chart of FIG. 6, the computer establishes a record mode at step 202 to write the information concerning the tune number and the performance start time in the TOC buffer memory 19 at step 203, before starting the recording of the performance information to the program area 6 at step 204. The record operation is continued until the silent period extending over three seconds is detected at step 205. When the silent period of over three seconds is detected at step 205, it is determined to be the interval between the tunes so that the absolute time information corresponding to the start of the silent period plus one second is written in the TOC buffer memory 19 as the performance end time. Then, at step 207, the operating state of the STOP key is monitored. When the operation of the STOP key is not received, the tune number is incremented at step 208. The program then reverts to step 203 where the information concerning the tune number and the performance start time is written in the TOC buffer memory 19 and the performance information for the next tune is recorded. The performance information is then consecutively recorded in the similar order. When the operation of the STOP key is received at step 207, the micro-computer release the record mode at step 209, while putting the TOC information in the TOC buffer memory 19 into order at step 210 before it comes into the stand-by state. In the operation of putting the TOC information into order at step 210, when the new performance information is over-written on the portion of the program area 6 where the performance information for several tunes, for example, is already recorded, the tune numbers are re-arranged in the order of the increasing absolute time information so that the tune numbers will be in the correct order.

Figure 7:
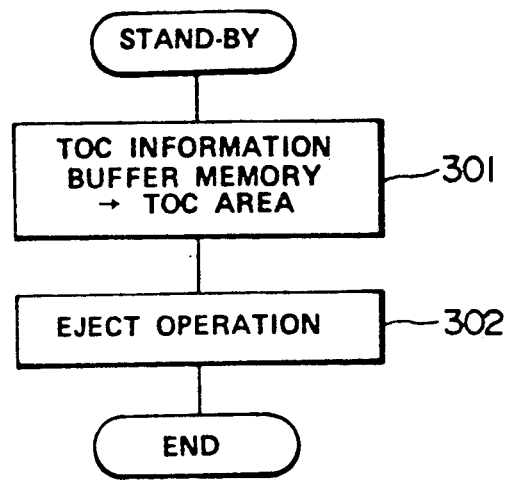
FIG. 7 is a flow chart showing the operation of the eject mode.

Referring to the flow chart of FIG. 7, when the eject mode is commanded in the stand-by state of the disk recording and/or reproducing apparatus by the actuation of the operating key 28, the TOC information stored in the TOC buffer memory 19 is recorded by the optical head 12 at step 301 in the lead-in area 7 of the recordable disk 1. The program then proceeds to step 301 to effect the disk ejection to terminate the operation.

Figure 8:
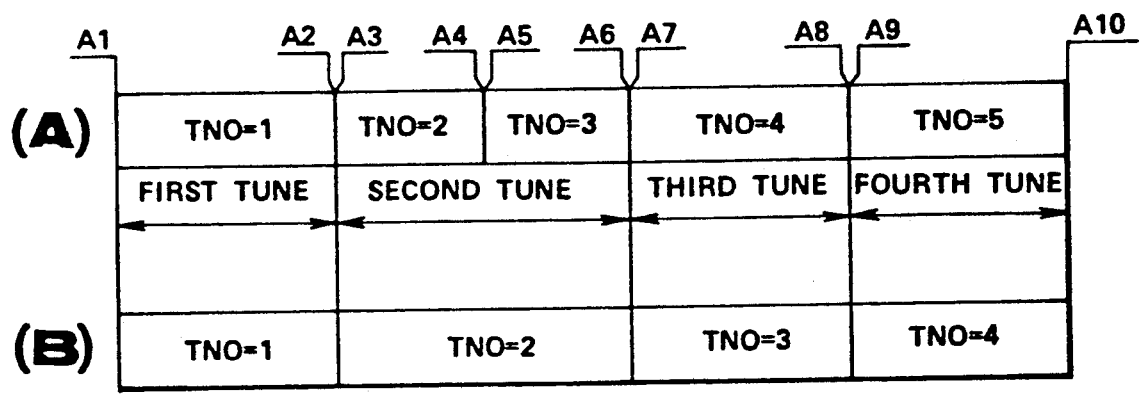
FIG. 8 is a diagrammatic view showing the relation between the tune number and the performance information recorded by the disk recording and/or reproducing apparatus on the recordable disk, wherein (A) and (B) show the states before and after correction of the TOC information, respectively.

It is now assumed that the performance information for four tunes has been recorded by the above described record mode in the program area 6 of the recordable disk 1, in such a manner that the performance of a first tune is started at time A1 and terminated at time A2, that of a second tune is started at time A3 and terminated at time A6, with a silent period not shorter than three seconds between the times A4 and A5, the performance for the third tune is started at time A7 and terminated at time A8 and that for the fourth tune is started at time A9 and terminated at time A10, as shown diagrammatically in FIG. 8(A). The silent period continuing for three or more seconds between the time A4 and the time A5 for the second tune is determined by the silent period detecting operation at step 205 to be the interval between the tunes, so that the TOC information for five tunes as shown in Table 1 is automatically formed with incrementation of the tune numbers (TNO) and recorded in the lead-in area 7 of the recordable disk 1.

TABLE 1

| | Contents of TOC Information | |
|---|---|---|
| TNO | Performance Start Time | Performance End Time |
| 1 | A1 | A2 |

TABLE 1-continued

| TNO | Contents of TOC Information | |
|---|---|---|
| | Performance Start Time | Performance End Time |
| 2 | A3 | A4 |
| 3 | A5 | A6 |
| 4 | A7 | A8 |
| 5 | A9 | A10 |

TABLE 2

| TNO | Contents of TOC Information | |
|---|---|---|
| | Performance Start Time | Performance End Time |
| 1 | A1 | A2 |
| 2 | A3 | A6 |
| 3 | A7 | A8 |
| 4 | A9 | A10 |

In the present disk recording and/or reproducing apparatus, when the recordable disk 1 containing the performance information recorded in the program area 6 and the TOC information recorded in the lead-in area 7 is to be reproduced, the micro-computer 17 performs an access control operation in such a manner that, in the stand-by mode in which the TOC information is reproduced from the lead-in area 7 so as to be stored in the TOC buffer memory 19, by the above described set-up mode operation, the reproducing mode is established as the micro-computer receives the operation of the PLAY key as the operating key 28, so that the performance information will be automatically reproduced from the program area 6 of the recordable disk 1 in accordance with the order of the tune numbers (TNO) of the TOC information.

Referring to the flow chart of FIG. 9, the micro-computer established at step 402 the link mode when it receives the operation of the LINK key in the above stand-by mode at step 401. The performance information of the tune number of the tune desired to be linked is accessed by the operating keys 28 such as the PLAY-, FR- or FF keys, and the tune is reproduced at step 403. When the operation of the LINK key is again received at step 404, the TOC information in the TOC buffer memory 19 is changed in such a manner that the information concerning the time of termination of the tune number being reproduced is shifted at step 405 so as to replace the information concerning the time of termination of the tune number one before that being reproduced, the TOC information for the tune number being reproduced is deleted, and that for any subsequent tunes is changed by incrementing the corresponding tune numbers at step 406. The program then reverts to the access and reproduce operation at step 403.

The micro-computer 17 monitors the operating state of the STOP key at step 407 when it has not received the operation of the LINK key at step 404. When the computer 17 does not receive the operation of the STOP key at step 407, it reverts to the access reproduce operation at step 403 so that it performs the LINK operation whilst the tunes recorded on the program area 6 of the recordable disk 1 are reproduced sequentially.

For example, when the operation of the LINK key is received at step 404 whilst the performance information indicated by the tune number TNO=3 which is the latter portion of a second tune, which is intrinsically one tune, the TOC information in the TOC buffer memory 19 is rewritten as shown in Table 2, from which it is seen that, by the correcting operation at step 405, the information concerning the performance end time A4 for TNO=2 is changed to the performance end time A6 for TNO=3 and that, by the correcting operation at step 406, the tune number TNO=4 as well as the following tune numbers are incremented by one.

When the micro-computer receives the operation of the STOP key at step 407, it releases the link mode at step 408 to come into the stand-by state.

When the eject mode is commanded in this stand-by mode, the TOC information which is stored in the thus corrected state in the TOC buffer memory 19 is re-recorded at step 301 in the lead-in area 7 of the recordable disk 1 by the optical head 12 by the eject mode operation shown in the flow chart of FIG. 7. The eject operation is thereafter performed at step 302 to terminate the operation.

By the above described operations for the link and eject modes, there is re-recorded in the lead-in area 7 of the recordable disk 1 the TOC information in which, as shown in FIG. 8(B), the tune numbers TNO are correctly allotted to the performance information units corresponding to the first to the fourth tunes recorded in the program area 6, with the performance information for the second tune being such that that performance start time and the performance end time are A3 and A6, respectively.

In the present embodiment, each of the information units recorded in the program area 6 of the recordable disk 1 is reproduced on the basis of the TOC information indicating the sequence of these units, while the operating input indicating the correction of the TOC information for the information unit being reproduced is received. This results in a simplified and reliable correction of the TOC information. The TOC information thus corrected is re-recorded in the lead-in area 7 of the recordable disk 1 so that the TOC information in the lead-in area may be corrected so as to be in correct register with each of the information units recorded in the program area 6.

In addition, in the present disk recording and/or reproducing apparatus, the micro-computer operates, as shown in the flow chart of FIG. 10, to establish a re-numbering mode at step 502 when it receives the operation of the RENUM key in the above stand-by state at step 501. Thus it clears at step 503 all of the flags affixed to each tune number of the TOC information in the TOC buffer memory 19, as shown in Table 3, then switches the operation of the display control section 43 and sets the tune number TNOa after the renumbering operation to "1", while causing the indication of the renumbering mode to be displayed at step 504 on the display screen of the display unit 29.

It is now assumed that the performance information continuing for example for 60 minutes may be recorded on the program area 6 of the recordable disk 1 and that the performance information for five tunes have already been recorded on the program area, in such a manner that the performance for the first tune is started at 00 minute 00 second and terminated at 05 minute 00 second, that for the second tune is started at 08 minute 00 second and terminated at 13 minute 00 second, that for the third tune is started at 15 minute 02 second and terminated at 20 minute 00 second, that for the fourth tune is started at 28 minutes 00 second and terminated at 36 minute 00 second and that for the fifth tune is started at 36 minute 20 second and terminated at 41 minute 00 second. It is also assumed that the TOC information indicating the respective record areas for the first to fifth tunes as well as the corresponding tune numbers by the absolute time information or absolute address data is recorded in the lead-in area 7 as the TOC information showing the record contents of the program area 6.

TABLE 3

| TNO | Contents of TOC Information | | flag |
|-----|-----------------------------|---|------|
|     | Performance Start Time | Performance End Time | |
| 1 | 00'00" | 05'00" | 0 |
| 2 | 08'00" | 13'00" | 0 |
| 3 | 15'03" | 20'00" | 0 |
| 4 | 28'00" | 36'00" | 0 |
| 5 | 36'20" | 41'00" | 0 |

When the renumbering mode is established, there are displayed on the display screen of the display unit 29 an indication "TNOa" indicating the tune number after the renumbering and an indication "TNOb" indicating the current tune number for the tune being reproduced, that is, the tune number before the renumbering, in addition to the upper case letter indication "RENUM" indicating the renumbering mode, as shown diagrammatically in FIG. 11.

The tune selected to be a new first tune is accessed and reproduced at step 505 from the program area 6 of the recordable disk 1 by the operation of the operating keys 28 such as PLAY-, FR- or FF key. When the micro-computer 17 receives the operation of the RENUM key in this state at step 506, it acts on the TOC information in the TOC buffer memory 19 such that the tune number of the tune being reproduced TNOb is changed to a new tune number TNOa after renumbering, at the same time that it sets a flag at step 507. The micro-computer 17 then increments the tune number TNOa after renumbering for the next tune, these tune numbers being displayed on the screen of the display unit 29. The computer 17 then reverts to the access and reproduce operation at step 505.

When the computer 17 has not received the operation of the RENUM key at step 506, it monitors the operating state of the STOP key at step 509. When the computer 17 has not received the operation of the STOP key at step 509, it reverts to the access and reproduce operation at step 505. Thus the renumbering operation is performed in such a manner that, while the tunes recorded in the program area 6 of the recordable disk 1 are reproduced in succession, new tune numbers TNOa are allotted to the tunes being reproduced, in place of the tune numbers TNOb. For example, when the operation of the RENUM key is received in the state of the tune number TNOb being "2" and then the operation of the RENUM key is received in the state of the tune number TNOb being "5", the tune numbers are rewritten as shown in the following Table 4.

TABLE 4

| TNO | Contents of TOC Information | | flag |
|-----|-----------------------------|---|------|
|     | Performance Start Time | Performance End Time | |
| 1 | 00'00" | 05'00" | 0 |
| 1 | 08'00" | 13'00" | 1 |
| 3 | 15'00" | 20'00" | 0 |
| 4 | 28'00" | 36'00" | 0 |

TABLE 4-continued

| TNO | Contents of TOC Information | | flag |
|-----|-----------------------------|---|------|
|     | Performance Start Time | Performance End Time | |
| 2 | 36'20" | 41'00" | 1 |

When the micro-computer 17 receives at step 509 the operation of the STOP key, it acts on the TOC information in the TOC buffer memory 19 such that the numbers following the maximum tune number associated with the flag are allotted at step 510 in the sequence of the increasing numbers to the tune numbers not associated with the flags. After the tune numbers are rearranged in this manner, all flags are cleared at step 511, as shown in Table 5. The micro-computer 17 then releases the renumbering mode at step 512 and comes into a stand-by state.

TABLE 5

| TNO | Contents of TOC Information | | flag |
|-----|-----------------------------|---|------|
|     | Performance Start Time | Performance End Time | |
| 1 | 08'00" | 13'00" | 0 |
| 2 | 36'20" | 41'00" | 0 |
| 3 | 00'00" | 05'00" | 0 |
| 4 | 15'03" | 20'00" | 0 |
| 5 | 28'00" | 36'00" | 0 |

In the above stand-by state, when the eject mode is commanded by the operation of the operating key 28, the eject operation is performed at step 302 by the eject mode operation shown in the flow chart of FIG. 7, after the TOC information stored in the TOC buffer memory 19 is re-recorded at step 301 in the lead-in area 7 of the recordable disk 1 by the optical head 12. The operation is then terminated.

From the foregoing it is seen that the present invention provides an opto-magnetic disk recording and/or reproducing apparatus, according to which the TOC information reproduced from the lead-in area of the opto-magnetic disk 1 is rearranged in any desired sequence commanded by the operating key 28 so as to be re-recorded in the lead-in area 7, such that the sequence in which the information units recorded in the program area 6 of the recordable disk 1 are reproduced may be easily and optionally commanded by the TOC information contained in the lead-in area 7.

What is claimed is:

1. A disk recording and/or reproducing apparatus in which a program area and a lead-in area are provided on a recordable disk of the kind provided with absolute addresses, such that units of performance information data separated by respective silent periods are recorded in said program area and archival information showing contents of said program area is recorded in said lead-in area and in which said program area is reproduced on the basis of said archival information in said lead-in area, wherein an improvement resides in that the apparatus comprises:

reproducing means for reproducing performance information data and archival information from a disk;

archival information storage means for storing the archival information reproduced from said lead-in area;

change control means for selectively changing the sequence of said archival information stored in said archival information storage means;

operator input means for commanding said change control means to make changes in the sequence of said archival information upon operation by an operator of the disk recording and/or reproducing apparatus;

recording means for reading the archival information, the sequence of which has been changed, from said archival information storage means. and re-recording same in said lead-in area of said recordable disk; and in which said change control means includes means for automatically allotting consecutive numbers starting at the maximum number of the archival information commanded to be changed by the operator operating said operator input means to the archival information not commanded to be changed by said operator input means and correction processing means for correcting the archival information stored in said archival information storage means in response to said operator input means during reproducing performance information data recorded in said program area, so that a performance information unit being reproduced is renumbered to the number of a preceding performance information unit so as to be included therein and following performance information units are renumbered consecutively starting from the number of the performance unit being reproduced, if a silent period is determined by the operator not to define a unit of recordable performance information data.

2. The apparatus according to claim 1 further comprising means for displaying the operating mode during changing the sequence of the archival information by said change control means.

3. In a method for recording on or reproducing from a recordable disk of the kind provided with absolute addresses, in which a program area and a lead-in area are provided on said disk, in which units of performance information data are recorded in said program area, and respective units of archival information data showing the record contents in said program area are recorded in said lead-in area, so that said program area is reproduced on the basis of said archival information data in said lead-in area, wherein an improvement in the method comprises the steps of:

reproducing the archival information data from said lead-in area;

storing the archival information data reproduced from said lead-in area;

initially changing the sequence of said units of archival information data;

automatically rearranging the sequence of the units of archival information data not initially changed in sequence, so as to be consecutive to the last one of the units of archival information data initially changed in sequence;

re-recording the changed sequence of said archival information data in said lead-in area; and reproducing said program area on the basis of said changed archival information data re-recorded in said lead-in area.

4. In a method for recording on or reproducing from a recordable disk of the kind provided with absolute addresses, in which a program area and a lead-in area are provided on said disk, in which units of performance information data separated by silent periods are recorded in said program area, and archival information data showing the record contents of said program area is recorded in said lead-in area and in which said program area is reproduced on the basis of the archival information data in said lead-in area, the method comprising the steps of:

recording archival information data in said lead-in area showing the sequence of the performance information data units recorded in said program area on the basis of silent periods having a predetermined length in said program area;

reproducing the recorded archival information data from said lead-in area;

storing the archival information reproduced from said lead-in area;

correcting said stored archival information on reception of an input command from an operator controlling the reproduction of the disc during reproduction of said program area so that the performance information data unit being reproduced is renumbered to the number of the preceding performance information data unit so as to be included therein and following performance information units are renumbered consecutively starting from the number of the performance unit being reproduced, if a silent period is determined by the operator not to define a unit of the recordable performance information data;

re-recording the corrected archival information in said lead-in area; and sequentially reproducing each of said performance information data units in said program area on the basis of said re-recorded archival information in said lead-in area.

* * * * *